United States Patent Office 2,831,036
Patented Apr. 15, 1958

2,831,036

SELECTIVE HALOGEN-HYDROGEN EXCHANGE

Herbert K. Wiese, Cranford, N. J., assignor to Esso Research and Engineering Company, a corporation of Delaware No Drawing. Application December 21, 1955
Serial No. 554,403

3 Claims. (Cl. 260—659)

This invention relates to a method for reacting acyclic tertiary type hydrocarbons with tertiary type organic chlorides to effect an exchange of the chlorine from the chlorides for hydrogen of the hydrocarbons in the presence of a sulfuric acid catalyst under conditions controlled to obtain selective conversion of the hydrocarbon to a chloride and high recovery of the hydrocarbon product which has undergone hydrogen substitution for its chlorine constituent. This application is a continuation-in-part of U. S. Serial No. 156,038, filed April 14, 1950, and now abandoned.

This method is valuable for preparing desired acyclic tertiary chlorides and for processes of obtaining the purification of nontertiary type hydrocarbons contaminated by tertiary type acyclic hydrocarbons.

Although sulfuric acid has been listed in the past among other condensation and alkylation catalysts, such as aluminum chloride and chloro sulfonic acid, each of these catalytic agents can be shown to have a different effect in reactions involving chlorides and tertiary type hydrocarbons, e. g. isoparaffins, such as isobutane. Aluminum chloride has been shown to have several effects on chlorides mixed with isoparaffins, such as dehalogenation, dehydrogenation, isomerization and polymerization, thus producing a variety of higher boiling olefin polymers, condensation products, and higher boiling paraffins as the chief products, indicated in U. S. Patent 2,353,766. Chloro sulfonic acid has been shown to have a more pronounced effect than aluminum chloride on the same reactants in causing reduction of a chloro-olefin with less dehydrogenation of the isoparaffin and less dehalogenation of the chloro-olefin, as indicated in U. S. 2, 447, 593. On the other hand, sulfuric acid was found to be unsuitable in such reactions involving chloro-olefins and isoparaffins as the reactants on account of its tendency to polymerize the olefinic compounds.

In accordance with the method of the present invention, it can be shown that a sulfuric acid catalyst differs from the other catalysts in being able to effect a hydrogen-halogen exchange more selectively. The tertiary type hydrocarbons and chlorides, as well understood, are compounds containing a carbon constituent which is directly linked to three other carbon constituents. The tertiary compounds of this invention are the branched acyclic alkanes, otherwise commonly termed isoparaffins.

Branched acyclic iso-alkanes having 6 to 8 carbon atoms are particularly amenable to the instant process. Included are such compounds as 2-methyl pentane, 3-methyl pentane, 2,2-dimethyl pentane, 2,4-dimethyl pentane, 2,2,3-trimethyl butane, 2-methyl hexane, 3-methyl hexane, 2-methyl heptane, and the like. Usually the preferred tertiary chloride reactant is tertiary butyl chloride which is one of the more readily available tertiary chlorides, and which when used in the process of the present invention becomes efficiently converted to isobutane. The isobutane product, in most instances, is readily separated from the other products and thereafter can be readily reconverted to tertiary butyl chloride and recovered for reuse in the process. The tertiary butyl chloride may be obtained by reaction of isobutene with hydrogen chloride.

The exact conditions for the halogen-hydrogen exchange reaction of the tertiary type saturated hydrocarbons and tertiary type chlorides in the presence of sulfuric acid depends somewhat on the exact reactants employed, the object of the process employed, and the products desired. In general, the hydrocarbon and the chloride reactants are vigorously agitated with sulfuric acid having an acid strength of 85% to 100%, preferably 90% to 100%, as in aqueous concentrated sulfuric acid; and the reaction mixture is maintained at a reaction temperature in the range of $+25°$ C. to $-25°$ C., preferably between $+10°$ C. to $-10°$ C. The chloride can be added all at once, in increments, or gradually during the reaction. The reaction period runs from several minutes to several hours depending on the temperature, reactants and ratio of the sulfuric acid catalyst to the sum of the reactants (hydrocarbon+chloride), and partial pressure of hydrogen chloride present in the reaction zone. The partial pressure of hydrogen chloride can vary from 0.1 to 5 atm.; and it is preferably maintained at between 0.1 to 2 atm. Thus, substantially anhydrous HCl is advantageously supplied from an extraneous source, and particularly if gaseous products are removed from the reaction mixture during the reaction. The total pressure should be sufficient to maintain the reactants in the liquid state; however, a liquid diluent, such as non-tertiary hydrocarbon may be employed in the reaction mixture to reduce the required pressure for maintaining the low boiling reactants in the liquid phase. The volume ratio of the reactants (hydrocarbon reactant plus halide reactant) to the catalyst can be varied over wide limits, ranging from 10/1 to 1/10, preferably from 2/1 to 5/1. Since the hydrogen-halogen exchange is reversible the extent and rate of reaction can be controlled by the ratio of the halide and hydrocarbon reactants in the reaction mixtures, as for example, by controlling the proportions admixed and rate of removal of any of the products.

The following examples will illustrate more specifically how controls are used in the method for obtaining certain products and for accomplishing certain separations with the selective hydrogen-halogen exchange.

*Example 1.—Chlorine substitution in tertiary alkanes*

The reactants, 2-methyl pentane mixed with t-butyl chloride in a mole ratio of 1.8/1, were mixed with 96% $H_2SO_4$ in a volume ratio of 3.1/1. The reaction mixture was maintained at about 0° C. for a contact time of two hours under a total pressure of 2 lbs./square inch gauge. At the end of the reaction, the organic product layer was stratified above the acid, was separated from the acid, washed with concentrated HCl, dried, and analyzed. The product analysis showed a 26 mole percent conversion of the hydrocarbon with a selectivity of 78.5% to 2-chloro-2-methyl pentane (B. P. 112°–113°C., $n_D^{20}$ 1.4129) and a 53 mole percent conversion of the t-butyl chloride with a selectivity of 82% to isobutane, the remaining minor amount of conversion products being higher boiling hydrocarbons and chlorides resulting from condensation reactions.

It is evident from the run described in the foregoing example that the hydrogen-halogen transfer was made to take place very selectively to give a high recovery of the isobutane with selective conversion of the tertiary type hydrocarbon to a tertiary chloride, i. e. to a chloride with a chlorine substituent attached to a tertiary carbon in the hydrocarbon reactant.

Thus, it was found that in addition to its utility for selectively producing chloride derivatives from the tertiary type hydrocarbons, the present method is adapted for separating tertiary type hydrocarbons from non-tertiary type hydrocarbons, e. g. in separating isobutane from its isomers, and for separating the usual branched alkane contaminants from cyclohexane, such as dimethylpentanes.

High purity cyclohexane is an important commercial product to be obtained from petroleum fractions which may be contaminated by 2,2-dimethyl pentane (B. P. 79.1° C.), 2,4-dimethyl pentane (B. P. 80.6° C.), 2,2,3-trimethyl butane (B. P. 80.8° C.), and 2,3-dimethyl pentane (B. P. 89.8° C.) In a close boiling cyclohexane cut taken at about the boiling point of cyclohexane (80.75° C.) such a cut will contain from about 5 to 15 volume percent of the mentioned contaminants difficult to separate on account of their close boiling points and tendencies to distill together with the cyclohexane. By determining the amount of these tertiary type hydrocarbons present in the cyclohexane cut to be purified, a suitable amount of tertiary butyl chloride reactant can be admixed in the presence of the sulfuric acid catalyst for carrying out the hydrogen-halogen exchange in the manner described.

Experiments were carried out in the manner above outlined for conversion of the tertiary type acyclic $C_7$—$C_8$ hydrocarbon contaminants to the $C_7$—$C_8$ chlorides, which are substantially higher boiling than cyclohexane, while the tertiary butyl chloride was selectively converted to isobutane. In this reaction it was found that the cyclohexane remained substantially unchanged as an inert diluent. Therefore, after separating the organic reaction product mixture from the acid, this mixture is stripped of the isobutane (B. P. —0.6° C.) and of the small amount unconverted t-butyl chloride (B. P. 51° C.), after which the cyclohexane is readily distilled from the remaining higher boiling reaction products comprising the chlorides of the tertiary hydrocarbon contaminants. By this treatment the isoparaffin contaminants of the cyclohexane are substantially eliminated; but if so desired, the treatment can be repeated to eliminate traces of these contaminants from the cyclohexane distillate. Quite advantageously the recovered isobutane may also be reacted with the $C_7$—$C_8$ chlorides of the tertiary hydrocarbon contaminants to recover tertiary butyl chloride reactants and the corresponding $C_7$—$C_8$ hydrocarbons of said chloride products using the selective hydrogen-halogen exchange method described.

To recover the tertiary chloride products without hydrolysis, the organic layer separated from the sulfuric acid layer is washed with hydro-chloric acid. The thus washed organic material freed of sulfuric acid may then be dried by contact with solid potassium carbonate.

*Example II.—Purification of commercial cyclohexane*

Commercial cyclohexane of 85% purity was mixed with about 1.5 parts by weight of 96% sulfuric acid and to this mixture maintained at temperatures of 5° to 9° C. was added t-butyl chloride in a proportion of about 1.3 moles per mole of impurities. After the reaction had proceeded to the extent that about half the t-butyl chloride was reacted, the organic layer was separated from the acid layer, washed free of the acid, dried, then distilled to recover a purified cyclohexane product. On the basis of the amount of t-butyl chloride reacted, nearly half the impurities present were converted to higher boiling chlorides from which the cyclohexane is easily fractionated.

Other catalysts such as aluminum chloride cannot be used satisfactorily in substitution for the sulfuric acid in purification of cyclohexane on account of its tendency to isomerize cyclohexane to methyl cyclopentane.

*Example III.—Purification of commercial heptane*

A commercial heptane to be purified contained:

| | Wt. percent |
|---|---|
| 2-methylhexane | 3.3 |
| 3-methylhexane | 13.3 |

Equal volumes of the impure heptane and 96% sulfuric were mixed at about 2° C. During the reaction period of about 3 hours and 15 minutes 100 parts by weight of t-butyl chloride were added per 173 parts by weight of the impure heptane. The organic product layer was separated from the acid, dried and fractionally distilled. The distilled product was found to contain less than about 5.5 wt. percent methylhexane.

In the operations described, if some olefine is present with the tertiary type saturated hydrocarbons to be reacted, preferably the sulfuric acid is mixed with the hydrocarbons prior to addition of the tertiary type halide to effect alkylation with the olefin to a higher boiling saturated hydrocarbon, for otherwise, the olefin may have a tendency to condense with the tertiary type halide and thereby form a series of alkyl halide products having various boiling points at the expense of the tertiary halide type reactant and with undesired formation of lower boiling products which would interfere.

What is claimed is:

1. A hydrogen halogen exchange process which comprises reacting a branched acyclic alkane having 6 to 8 carbon atoms with tertiary butyl chloride in the presence of a catalytic amount of sulfuric acid having an acid strength of 85 to 100% at a reaction temperature of about +25° C. to —25° C., maintaining a hydrogen chloride partial pressure of 0.1 to 5 atmospheres until a substantial amount of the chloride of said acyclic alkane is formed and separating the chlorinated acyclic alkane thus produced.

2. A process for producing 2-chloro-2-methyl pentane which comprises reacting 2-methyl pentane with tertiary butyl chloride in the presence of a catalytic amount of sulfuric acid having an acid strength of 85 to 100% in a liquid phase at +25° C. to —25° C., under a hydrogen chloride partial pressure of 0.1 to 5 atmospheres until a substantial amount of the 2-methyl pentane is converted to 2-chloro-2-methyl pentane, separating the resulting organic product from the acid, washing the organic product with concentrated hydrochloric acid and drying the washed product.

3. A process of separating an acyclic isoparaffin from a mixture thereof and a cycloalkane having a boiling point close to said acyclic isoparaffin which comprises reacting said acyclic isoparaffin with tertiary butyl chloride in the presence of liquid sulfuric acid catalyst having an acid strength of 85 to 100% at a temperature of +25° to —25° C., maintaining a partial pressure of 0.1 to 5 atmospheres of hydrogen chloride until said acyclic isoparaffin is converted to an organic chloride which is substantially higher boiling than the cycloalkane, separating the resulting organic reaction product mixture from the acid, distilling from the thus separated organic product unconverted tertiary butyl chloride and isobutane, and distilling cycloalkane from the remaining product.

References Cited in the file of this patent

UNITED STATES PATENTS

| 2,396,486 | Ballard | Mar. 12, 1946 |
| 2,744,940 | Pines | May 8, 1956 |